(12) United States Patent
Rossi

(10) Patent No.: US 8,152,105 B2
(45) Date of Patent: Apr. 10, 2012

(54) PARACHUTE CANOPY PACKING SLEEVE AND METHOD OF USE

(76) Inventor: Anthony John Rossi, Bennington, VT (US)

( * ) Notice: Subject to any disclaimer, the term of this patent is extended or adjusted under 35 U.S.C. 154(b) by 741 days.

(21) Appl. No.: 11/830,965

(22) Filed: Jul. 31, 2007

(65) Prior Publication Data

US 2009/0032646 A1 Feb. 5, 2009

(51) Int. Cl.
*B64D 17/00* (2006.01)
*B64D 17/40* (2006.01)
*B64D 17/52* (2006.01)

(52) U.S. Cl. ........................................ 244/148; 244/142

(58) Field of Classification Search .................. 244/148, 244/147, 142; 223/37, 111–113; 53/241, 53/262, 256, 255, 261; 100/40
See application file for complete search history.

(56) References Cited

U.S. PATENT DOCUMENTS

| | | | |
|---|---|---|---|
| 1,712,307 A | 5/1929 | McClintock | |
| 1,970,193 A | 8/1934 | Reibel | |
| 2,597,364 A * | 5/1952 | Nash | 53/261 |
| 2,637,464 A | 5/1953 | Vogel | |
| 2,936,138 A | 5/1960 | Stencel | |
| 3,458,966 A | 8/1969 | Dunbar | |
| 3,774,249 A | 11/1973 | Ybarra | |
| 4,313,291 A | 2/1982 | Crowell | |
| 4,709,818 A | 12/1987 | Spinosa | |
| 4,738,287 A | 4/1988 | Klinkel | |
| 5,069,404 A | 12/1991 | Bouchard | |
| 5,199,245 A | 4/1993 | Daddario | |
| 5,951,079 A * | 9/1999 | Winskye | 294/55 |
| 6,279,791 B1 | 8/2001 | Betman | |
| 6,360,927 B1 | 3/2002 | Baker | |
| 6,626,400 B1 | 9/2003 | Booth | |
| 6,814,269 B1 | 11/2004 | Fernandez | |
| 7,090,169 B2 | 8/2006 | Swanson | |

* cited by examiner

*Primary Examiner* — Tien Dinh
*Assistant Examiner* — Richard R Green
(74) *Attorney, Agent, or Firm* — Aquilla Patents & Marks PLLC; Thomas T. Aquilla

(57) ABSTRACT

A parachute packing system for facilitating insertion of a parachute canopy into a deployment receptacle or parachute receptacle includes an adjustable spring-like cylindrical sleeve that conforms to a "C"-shaped cross section, the sleeve member having rounded edges to prevent snagging of parachute material, and a gap defining a line passage slot within the cylindrical sleeve for passage of parachute suspension lines and bridle, and a pair of opposing deployment receptacle attachment points or knobs affixed to the outer surface of the cylindrical sleeve. Preferably, at least one of the receptacle attachment points or knobs engages a slotted track for sliding adjustment thereof, and a mechanism for reversibly locking the receptacle attachment point or knob within the slotted track. Optionally, the cylindrical sleeve includes an integral mat attachment hook, which runs across the bottom of the sleeve opening, for attachment to a packing mat made of non-slip rubberized material.

19 Claims, 3 Drawing Sheets

Fig. 1
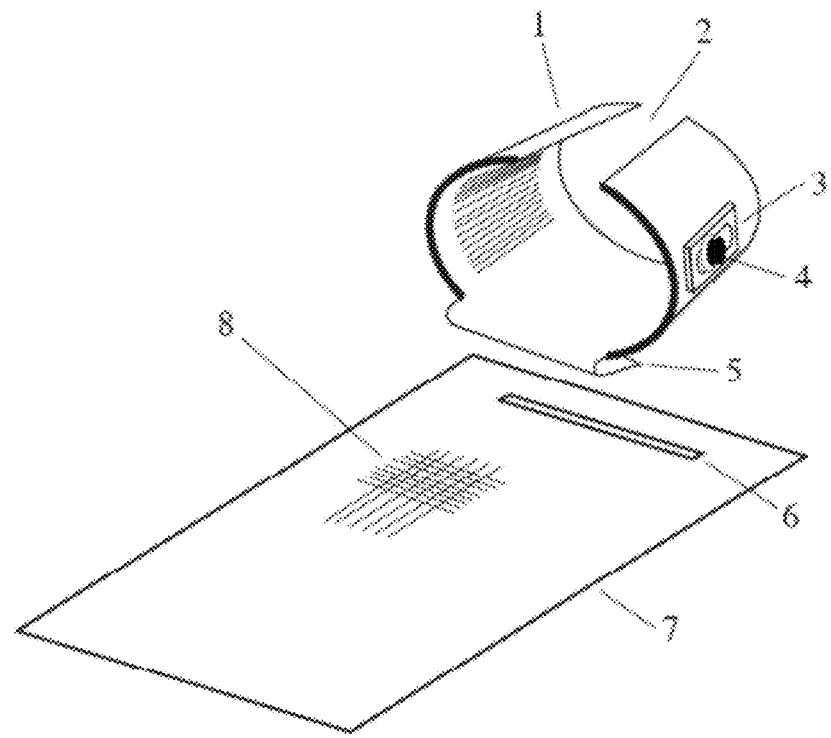
Fig. 2A/2B
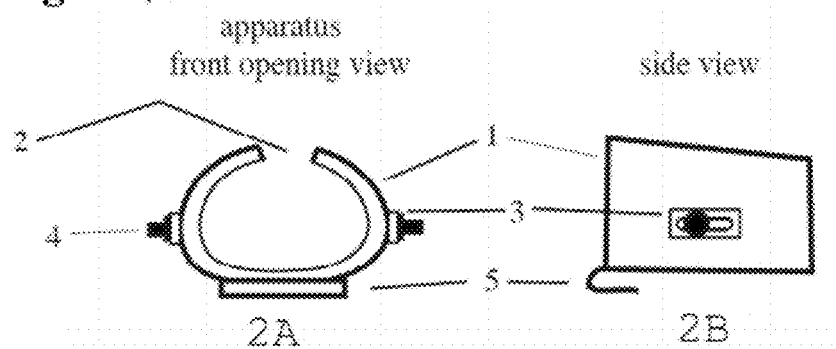

3A

3B

3C

3D

PARACHUTE CANOPY PACKING SLEEVE AND METHOD OF USE

BACKGROUND OF THE INVENTION

1. Field of the Invention

The invention pertains to the field of parachute packing systems. More particularly, the invention pertains to a method and apparatus for packing a parachute canopy into a parachute deployment receptacle.

2. Description of Related Art

Parachute packing is a tedious and strenuous operation, which currently is done completely by hand. Most parachutes for sport and military jumps or cargo drops require placement into tightly confined receptacles for later deployment in midair. The parachute must be carefully folded, or "packed" to ensure that it will open reliably. In the U.S. and many developed countries, emergency and reserve parachutes are packed by "riggers" who must be trained and certified according to legal standards. Sport skydivers are always trained to pack their own primary "main" parachutes. The parachute canopy must be neatly folded in a consistent manner throughout the packing process, because a disorganized or sloppy placement into the deployment receptacle can result in malfunctions during the deployment sequence. Indeed, parachutes can malfunction in several ways, particularly if they are not packed properly. Malfunctions can range from minor problems that can be corrected in-flight and still be landed, to catastrophic malfunctions that require the main parachute to be cut away using a modern 3-ring release system, and the reserve to be deployed. Most skydivers also equip themselves with small barometric computers (known as an AAD or Automatic Activation Device, such as, for example, those sold under the trademarks Cypres, FXC or Vigil) that will automatically activate the reserve parachute if the skydiver himself has not deployed a parachute to reduce his rate of descent by a preset altitude. Exact numbers are difficult to estimate, but approximately one in a thousand sports main parachute openings malfunction, and must be cut away, although some skydivers have many thousands of jumps and never cut away (either they pack their mains more carefully than average or they are just lucky). Although skydiving can have its thrills and excitements, it can be very dangerous too. Folding a parachute requires a high degree of skill, and an improperly folded parachute will not deploy, causing you to fall freely to the ground. Thus, the need for careful packing cannot be overstated.

The parachute canopies usually are very slippery, bulky, delicate, and have a fabric memory, thus they are difficult to fold and maintain in a compressed state, while attempts are made to place them into their relatively small deployment bags or receptacles. Because the deployment bags are made of loose fabric, they also are difficult to control and position during the insertion of the folded canopy in a compressed state. For novices and experts alike, this is usually a very frustrating exercise, requiring strength, dexterity and complex hand movements. In many cases, the difficulty of this operation results in a poor pack job, which may increase the possibility of a malfunction or requires the parachute packer to start the process over.

There are a number of already existing devices that are intended to aid in the process of packing and/or deployment of a parachute canopy. Some such devices are intended to, for example, aid in folding or packing a parachute. A common, preferred and well-known method for folding a current generation ram air parachute is referred to as the "PRO" (Proper Ram air Organization) pack.

U.S. Pat. No. 7,090,169 to Swanson et al. discloses a retaining clamp for alignment of risers, when packing a parachute. The retaining clamp comprises a base with three prongs defining bores for receiving and engaging large rings of three-ring release assemblies (three-ring release assemblies are used for cutting off the main parachute canopy in the event of malfunction before deploying the secondary parachute in order to avoid entanglement between the main and secondary parachutes). The large rings are inserted in the bores, turned and engaged with the bores by way of force of friction. An alternative embodiment of the retaining clamp comprises a base with two prongs defining a bore for receiving and engaging large rings of three-ring release assemblies. Both embodiments can be used in combination with a parachute folding mat.

U.S. Pat. No. 6,626,400 to Booth discloses a parachute system operable with a drogue parachute, including a bridle and kill line connected to a deployment bag at one end and to the drogue parachute at another. The bridle includes a stop carried within the parachute receptacle for suspension of the parachute receptacle by the drogue parachute during free fall. A plate is carried within the parachute receptacle for securing the stop, when the flaps are in a locked and closed position by a closing member and ripcord. The ripcord includes a ripcord pin and a ripcord line passing through an eyelet of the ripcord pin and attached at a fixed end to the parachute receptacle for providing a pulley effect and thus a mechanical advantage when the free end of the ripcord is pulled. The ripcord further includes left and right lines carried within a housing and an elastic cord between their free ends for biasing ripcord handles against the ripcord housing. To further prevent an out of sequence deployment of the drogue parachute and main parachute, a safety pin is carried by the bridle outside the parachute receptacle and is connected to the ripcord pin for preventing removal of the ripcord pin from the closing member until deployment of the drogue parachute causes the bridle to pull the safety pin from the ripcord pin, thus allowing the ripcord line to pull the ripcord pin from the closing member only after the drogue parachute has been deployed.

U.S. Pat. No. 5,069,404 to Bouchard discloses an improved parachute utilizing a ram air design and having an upper surface connected to a lower surface by a plurality of rib members and forming a plurality of chambers therebetween. The end chambers are smaller than the center chambers and this increases the lift-to-drag ratio of the parachute. The parachute has a substantially elliptical planform so as to increase the aspect and glide ratios of the parachute.

U.S. Pat. No. 4,313,291 to Crowell discloses a system and method for refurbishing and processing parachutes is disclosed including an overhead monorail conveyor system on which the parachute is suspended for horizontal conveyance. The parachute is first suspended in partially open tented configuration wherein open inspection of the canopy is permitted to remove debris and inspect all areas. Following inspection, the parachute is transported by the monorail conveyor to a washing and drying station with the parachute canopy mounted on the conveyor in a systematic arrangement which permits water and air to pass through the ribbon-like material of the canopy. Following drying of the parachute, the parachute is conveyed into an interior space where it is finally inspected and removed from the monorail conveyor and laid upon a table for folding. Following folding operations, the parachute is once again mounted on the conveyor in an elongated horizontal configuration and conveyed to a packing area for stowing the parachute in a deployment bag.

U.S. Pat. No. 2,936,138 to Stencel discloses a method for folding parachutes and a product therefore.

U.S. Pat. No. 1,712,307 to McClintock discloses a parachute pack.

Although there are known devices that are intended to aid in folding or packing a parachute canopy, one problem with the known devices is that they do not provide means for holding open the deployment bag or receptacle, so that a folded parachute canopy can then be pushed into the open deployment receptacle. Thus, there is a need in the art for a convenient apparatus for neatly packing a parachute canopy into a parachute deployment receptacle that overcomes the foregoing and other limitations of the prior art.

SUMMARY OF THE INVENTION

The present invention provides a method and apparatus for packing a parachute canopy into a parachute deployment bag, enclosure or receptacle. Briefly stated, the invention provides in one embodiment an adjustable spring-like cylindrical sleeve that conforms to a "C"-shaped cross section, the sleeve member having rounded edges to prevent snagging of parachute material, the cylindrical sleeve member having a gap defining a line passage slot running along the length of the sleeve for passage of the parachute suspension lines and bridle, and a pair of opposing deployment bag attachment points or knobs affixed to the outer surface of the cylindrical sleeve.

In a preferred embodiment, the invention provides an adjustable spring-like cylindrical sleeve that conforms to a "C"-shaped cross section and having a gap defining a line passage slot running along the length of the sleeve for passage of the parachute suspension lines and bridle, and a pair of opposing deployment bag attachment points or knobs affixed to the outer surface of the cylindrical sleeve, wherein at least one of the bag attachment points or knobs engages a slotted track for sliding adjustment thereof, and a mechanism for reversibly locking the bag attachment point or knob within the slotted track.

In an alternative embodiment, the invention provides an adjustable spring-like cylindrical sleeve that conforms to a "C"-shaped cross section, the sleeve member having rounded edges to prevent snagging of parachute material, and having a gap defining a line passage slot running along the length of the sleeve for passage of the parachute suspension lines and bridle, and a pair of opposing deployment bag attachment points or knobs affixed to the outer surface of the cylindrical sleeve, wherein at least one of the bag attachment points or knobs engages a slotted track for sliding adjustment thereof, and a mechanism for reversibly locking the bag attachment point or knob within the slotted track, and wherein the cylindrical sleeve further includes an integral mat attachment hook, which runs across a portion of the bottom of the sleeve opening, for attachment to a packing mat.

The apparatus according to the invention holds open a parachute deployment bag or receptacle, so that a parachute canopy can then be pushed through the sleeve-like tool and into its receptacle. The parachute receptacle or deployment bag is fitted over one end of the cylindrical sleeve and attached by means of hooks, clips or adjustable knobs to hold the deployment bag components under tension. Optionally, the cylindrical packing sleeve also is attached to a canopy packing mat to hold the sleeve stationary during the packing process. The invention thus provides convenient means for holding open the deployment bag or receptacle, so that the folded parachute canopy can then be pushed neatly into the open deployment receptacle. In an alternative embodiment, the invention further provides convenient means for holding the packing sleeve stationary by attachment to a packing mat, which further facilitates proper folding and packing of the parachute.

These and other features and advantages will become readily apparent from the following detailed description, which should be read in conjunction with the accompanying drawing figures.

BRIEF DESCRIPTION OF THE DRAWING

FIG. 1 shows a perspective view of a parachute canopy packing sleeve and packing mat in accordance with an embodiment of the present invention.

FIGS. 2A and 2B shows front and side views of a parachute canopy packing sleeve in accordance with an embodiment of the present invention.

DETAILED DESCRIPTION OF THE INVENTION

Figures 3A, 3B, 3C, 3D:
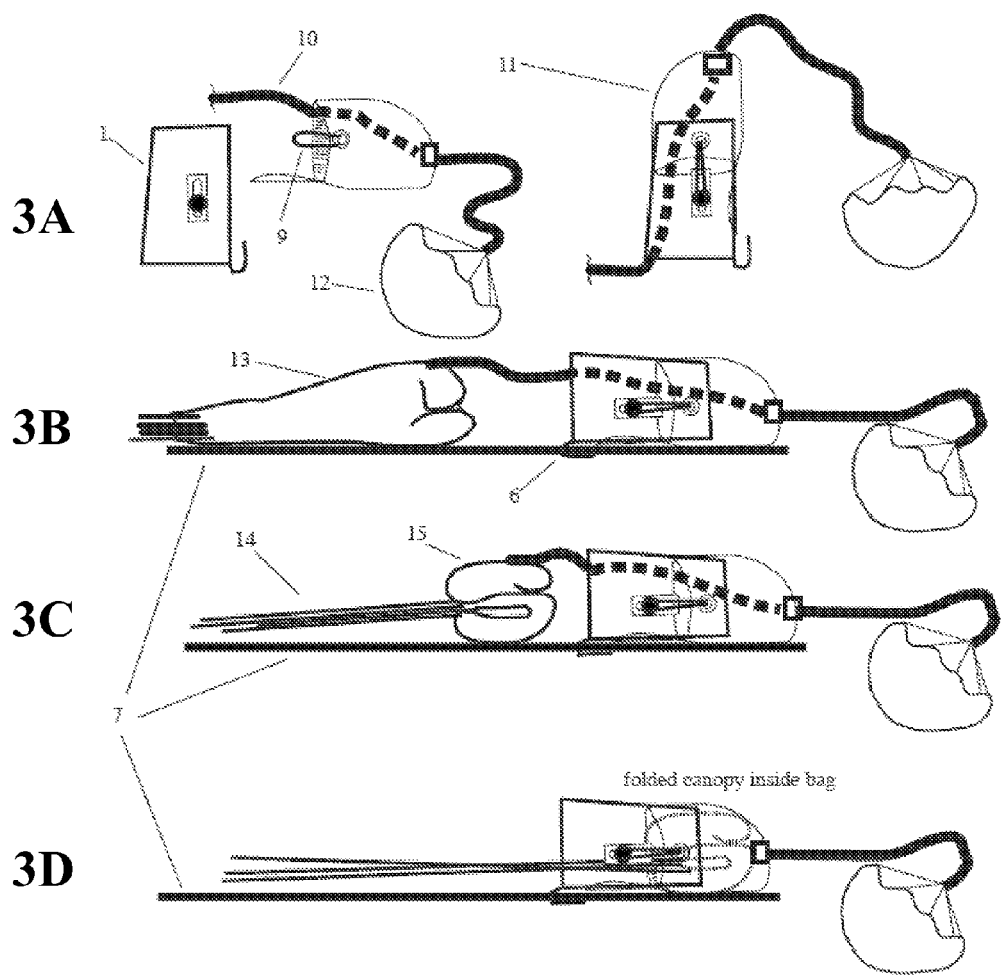
FIGS. 3A-3D show sequential views of certain steps in the process of using a parachute canopy packing sleeve and packing mat in accordance with an embodiment of the present invention.

The following description relates to certain preferred embodiments of a parachute canopy packing apparatus made in accordance with the present invention. It is understood that numerous variations and modifications, other than those specifically indicated herein, will be apparent to those of sufficient skill in the art, in light of the teachings herein. It is therefore understood that within the scope of the appended claims, the invention may be practiced otherwise than as specifically described herein. In addition, certain terms are used throughout the discussion in order to provide a convenient frame of reference with regard to the accompanying drawings, such as, for example, "inner" or "outer", "top" or "bottom", and the like. Such terms are not intended to be specifically limiting of the invention, except where so indicated in the claims.

A common and well-known method for folding a current generation ram air parachute is referred to as the "PRO" (Proper Ram air Organization) pack. The present invention was developed for use with this type of packing method, but can also be used with other means of hand packing and with other parachute types.

A parachute usually refers to a soft fabric device used to slow the motion of an object through an atmosphere by creating drag. Parachutes are normally used to slow the descent of a person or object to Earth or another celestial body within an atmosphere. Drogue parachutes are also sometimes used to aid horizontal deceleration of a vehicle (a fixed-wing aircraft, or a drag racer), or to provide stability (tandem freefall, or space shuttle after touchdown). The word parachute comes from the French words "para", protect or shield, and "chute", the fall. Therefore, "parachute" actually means "fall protection". Many modern parachutes are classified as semi-rigid wings, are quite maneuverable, and can facilitate a controlled descent similar to that of a glider. The term parachute is used very broadly herein and is intended to include any type of parachute or similar apparatus, including but not limited to round parachutes, cruciform or square parachutes, annular and pull down apex parachutes, ribbon and ring parachutes, and ram-air parachutes. Also included are "tandem" or two-person parachute canopies, which are in very wide use and can benefit from this invention, particularly since they are almost twice the size of a typical sport canopy.

Parachutes were once made from silk, but now they are almost always constructed from more durable woven nylon fabric, sometimes coated with silicone to improve performance and consistency over time. Originally, silk was used for parachute suspension lines, but was replaced by nylon during World War II. When square (also called ram-air) parachutes were introduced, manufacturers switched to low-stretch, synthetic materials, such as Dacron polyester, or zero-stretch synthetic materials, such as Spectra, Kevlar, Vectran and high-modulus aramids. Kevlar is rarely seen except on reserve canopies. Personnel ram-air parachutes are loosely divided into two varieties: rectangular or tapered, commonly referred to as "squares" or "ellipticals" respectively. Medium-performance canopies (reserve-, BASE-, canopy formation-, and accuracy-type) are usually rectangular.

High-performance, ram-air parachutes have a slightly tapered shape to their leading and/or trailing edges when viewed in plan form, and are known as ellipticals. Sometimes all the taper is in the leading edge (front), and sometimes in the trailing edge (tail). Ellipticals are usually used only by sports parachutists. Ellipticals often have smaller, more numerous fabric cells and are shallower in profile. Their canopies can be anywhere from slightly elliptical to highly elliptical—indicating the amount of taper in the canopy design, which is often an indicator of the responsiveness of the canopy to control input for a given wing loading, and of the level of experience required to pilot the canopy safely. The rectangular parachute designs tend to look like square, inflatable air mattresses with open front ends. They are generally safer to operate, because they are less prone to dive rapidly with relatively small control inputs, they are usually flown with lower wing loadings per square foot of area, and they glide more slowly.

The present invention solves various problems and provides a distinct advance in the art of parachute packing. More particularly, the present invention provides a method and apparatus for packing a parachute canopy into a parachute deployment bag, enclosure or receptacle. The terms deployment bag, deployment enclosure and deployment receptacle are used interchangeably herein to refer generally to any type of parachute deployment receptacle, regardless of its shape, configuration or material. Apparatus according to the invention holds open the parachute deployment bag or receptacle so that a parachute canopy can then be pushed through the sleeve-like tool and into its receptacle. The apparatus according to the invention provides an adjustable spring-like cylindrical sleeve that conforms to a "C"-shaped cross section, the sleeve member having rounded edges to prevent snagging of parachute material, and having a gap defining a line passage slot within the cylindrical sleeve for passage of the parachute suspension lines and bridle, and a pair of opposing deployment bag attachment points or knobs affixed to the outer surface of the cylindrical sleeve. The parachute receptacle or deployment bag is fitted over one end of the cylindrical sleeve and attached by means of hooks, clips or adjustable knobs to hold the deployment bag components under tension. The invention thus provides convenient means for holding open the deployment bag or receptacle, so that the folded parachute canopy can then be pushed neatly into the open deployment receptacle.

In the preferred embodiment, the invention provides an adjustable spring-like cylindrical sleeve that conforms to a "C"-shaped cross section, the sleeve member having rounded edges to prevent snagging of parachute material, and having a gap defining a line passage slot within the cylindrical sleeve for passage of the parachute suspension lines and bridle, and a pair of opposing deployment bag attachment points or knobs affixed to the outer surface of the cylindrical sleeve, wherein at least one of the bag attachment points or knobs engages a slotted track for sliding adjustment thereof, and a mechanism for reversibly locking the bag attachment point or knob within the slotted track.

In an alternative embodiment, the invention provides an adjustable spring-like cylindrical sleeve that conforms to a "C"-shaped cross section, the sleeve member having rounded edges to prevent snagging of parachute material, and having a gap defining a line passage slot within the cylindrical sleeve for passage of the parachute suspension lines and bridle, and a pair of opposing deployment bag attachment points or knobs affixed to the outer surface of the cylindrical sleeve, wherein at least one of the bag attachment points or knobs engages a slotted track for sliding adjustment thereof, and a mechanism for reversibly locking the bag attachment point or knob within the slotted track, and wherein the cylindrical sleeve further includes an integral mat attachment hook, which runs across the bottom of the sleeve opening, for attachment to a packing mat.

The cylindrical sleeve of the present invention can be made from practically any material, but preferably is made from a thermoplastic material, such as polypropylene or polyethylene (more preferably HDPE) by injection molding. Other suitable materials may include, for example, wood or wood composites, metal alloys or composites, styrene polymers and copolymers, ABS, acrylics, cellulosics, vinyls, nylons, polycarbonate, PVC and various fluorocarbon materials.

Figures 4A, 4B, 4C:
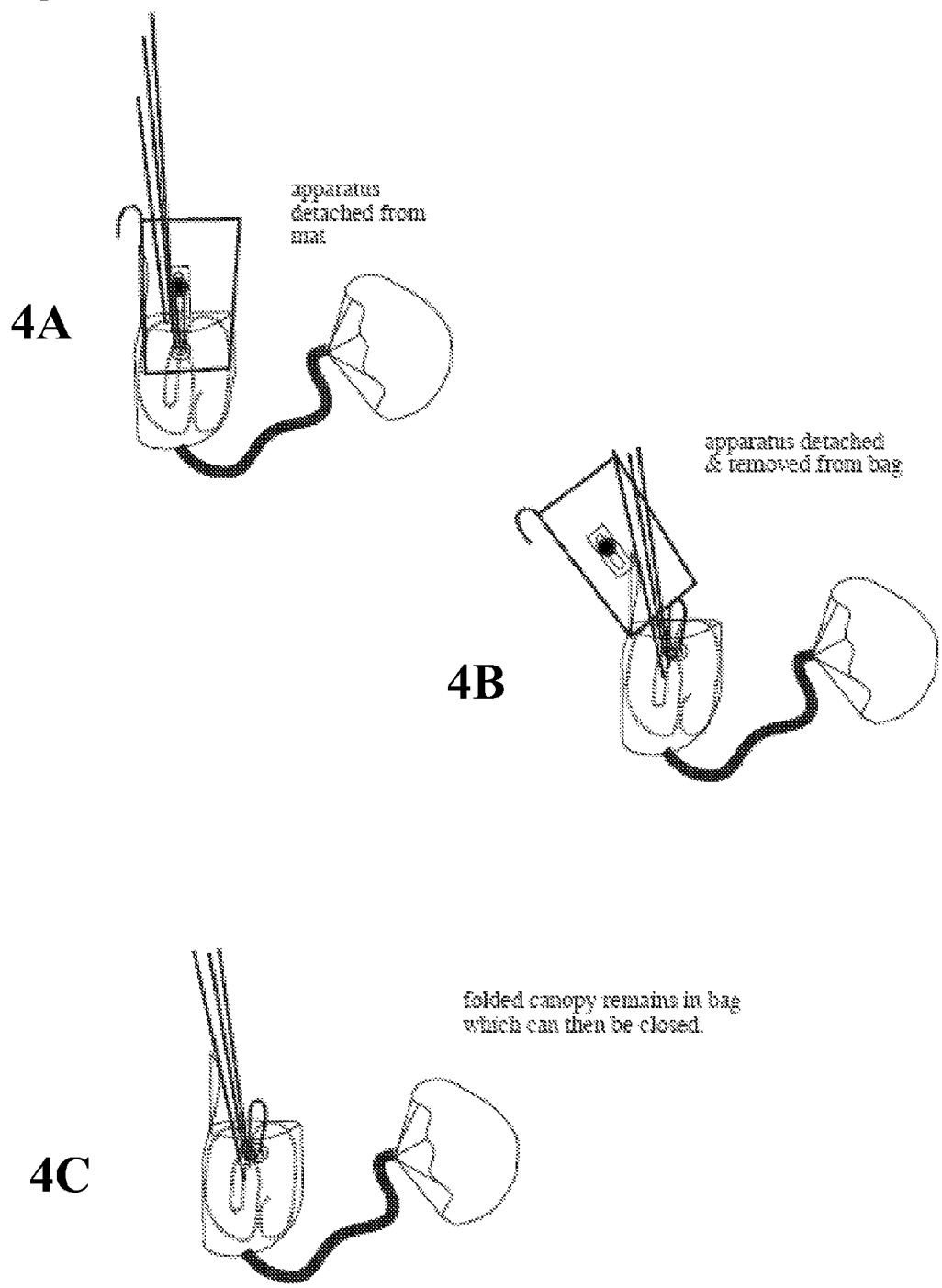
FIGS. 4A-4C show sequential views of certain steps in the process of using a parachute canopy packing sleeve in accordance with an embodiment of the present invention.

The present invention provides a unique flexible, reusable, semi-tubular shaped tool, made from a smooth semi-rigid thermoplastic, rubberized or composite sheet material, onto which the parachute deployment bag or receptacle fits over one end. This sleeve-like tool maintains the receptacle or bag in a more rigid, open, and easier to handle configuration, while the parachute canopy is being folded and inserted into the deployment receptacle. The invention works as follows (see, e.g., FIG. 3A-D). One end of the parachute packing sleeve is fitted into the bag or receptacle and is attached under tension by means of hooks, clips, or adjustable protrusions, using the elastic rubber bands or other features that are associated with the deployment bag. The parachute packing sleeve with attached deployment bag is then optionally affixed to a packing mat having a slot made to hold the apparatus in place. After most of the air has been squeezed out of the parachute and proper folding has yielded a neatly compressed canopy, it is then be pushed into the deployment receptacle as follows. While maintaining pressure on the folded canopy, it is then pushed through the flexible packing sleeve and into the attached receptacle, or while the packer is kneeling on the optional packing mat, which holds the packing sleeve and deployment bag in place. After the folded canopy has been pushed into the deployment bag, the packing sleeve can be detached and easily slides out, leaving the properly aligned, compressed canopy in the deployment bag, without disturbing the parachute suspension lines or canopy fabric (see FIG. 4). The deployment bag can then be closed.

Referring now to FIG. 1, a perspective view of a parachute canopy packing sleeve and packing mat in accordance with an embodiment of the present invention is shown. FIGS. 2A-B shows the front and side views. The parachute packing sleeve comprises an adjustable spring-like cylindrical sleeve member 1 that conforms to a "C"-shaped cross section, the sleeve member 1 having rounded edges to prevent snagging of parachute material, and having a gap defining a line passage slot 2 within the cylindrical sleeve 1, for passage of the parachute suspension lines 14 and the bridle 10 of the pilot chute 12, and a pair of opposing deployment bag attachment points or knobs 4 affixed to the outer surface of the cylindrical sleeve 1. As shown in the figures, the bag attachment points or knobs 4 engage a slotted track 3 for sliding adjustment thereof, and include a mechanism for reversibly locking the bag attachment point or knob 4 within the slotted track 3. Optionally, the cylindrical sleeve member 1 further includes an integral mat attachment hook 5, which runs across at least a portion of the bottom of the sleeve member opening, for attachment to an attachment slot 6 of an optional parachute canopy packing mat 7, which preferably includes a non-slip surface 8.

Referring now to FIGS. 3A-C and 4A-C, sequential views of certain steps in the process of using a parachute canopy packing sleeve and packing mat in accordance with an embodiment of the present invention are shown. One end of the parachute packing sleeve is fitted into the deployment bag or receptacle 11 and is attached under tension by means of hooks, clips, or adjustable knobs 4, using the elastic rubber bands 9 or other features that are associated with the deployment bag. The parachute packing sleeve with attached deployment bag 11 is then optionally affixed to a packing mat 7 having a slot 6 made to receive and hold the packing sleeve in place via the mat attachment hook 5. After most of the air has been squeezed out of the unfolded parachute canopy 13 and proper folding has yielded a neatly compressed canopy, it is then pushed through the cylindrical sleeve 1, while maintaining pressure on the folded canopy 15, and then pushed into the deployment receptacle 11. The folded canopy 15 is then further pushed through the flexible packing sleeve 1 and into the attached receptacle 11, optionally while the packer is kneeling on the optional packing mat 7, which holds the packing sleeve and deployment bag in place. After the folded canopy 15 has been pushed into the deployment bag 11, the packing sleeve can be detached and easily slides out, leaving the properly aligned, compressed canopy 15 in the deployment bag 11, without disturbing the parachute suspension lines 14 or canopy fabric (see, e.g., FIGS. 4A-4C). The deployment bag can then be closed.

What is claimed is:

1. A parachute packing system, comprising:
   a) a smooth, one-piece, flexible, semi-cylindrical funnel-like sleeve member, said sleeve being completely smooth and snag-free to prevent snagging of parachute material, and being suitable for compressing a fabric parachute canopy material into a deployment receptacle;
   b) a gap defining a line passage slot within the cylindrical sleeve;
   c) a pair of opposing deployment receptacle attachment points or knobs affixed to an outer surface of the cylindrical sleeve member; and
   d) a parachute deployment receptacle for attachment to said sleeve member to accept the fabric parachute canopy material.

2. The system of claim 1, wherein at least one of the deployment receptacle attachment points or knobs engages a slotted track for sliding adjustment thereof.

3. The system of claim 2, further comprising means for reversibly locking the deployment receptacle attachment point or knob within the slotted track.

4. The system of claim 2, wherein the cylindrical sleeve member includes an integral mat attachment means.

5. The system of claim 4, wherein the mat attachment means comprises a molded hook located along at least a portion of the bottom of the sleeve member.

6. The system of claim 4, further comprising a mat comprising a non-slip or rubberized material, having a smooth surface and a slot for receiving mat attachment means of said sleeve member.

7. The system of claim 1, wherein the cylindrical sleeve member comprises a polyolefin or a thermoplastic material.

8. The system of claim 7, wherein the sleeve member material is polypropylene, polyethylene or high density polyethylene.

9. The system of claim 8, wherein the cylindrical sleeve member is manufactured by injection molding.

10. The system of claim 7, wherein the cylindrical sleeve member is manufactured by injection molding.

11. A parachute packing system, comprising:
   a) an adjustable spring-like cylindrical sleeve member that conforms to a substantially "C"-shaped cross section;
   b) a gap defining a line passage slot within the cylindrical sleeve member;
   c) a pair of opposing deployment receptacle attachment points or knobs affixed to an outer surface of the cylindrical sleeve member;
   d) an integral mat attachment means comprising a molded hook along a portion of the bottom of the cylindrical sleeve member;
   e) a packing mat comprising a non-slip or rubberized material, having a smooth surface and a slot for receiving mat attachment means of said sleeve member; and
   f) a parachute deployment receptacle for attachment to said sleeve member to accept the fabric parachute canopy material.

12. The system of claim 11, wherein at least one of the deployment receptacle attachment points or knobs engages a slotted track for sliding adjustment thereof.

13. The system of claim 12, further comprising means for reversibly locking the deployment receptacle attachment point or knob within the slotted track.

14. The system of claim 11, wherein the cylindrical sleeve member comprises a polyolefin or a thermoplastic material.

15. The system of claim 11, wherein the sleeve member material is polypropylene, polyethylene or high-density polyethylene.

16. The system of claim 15, wherein the cylindrical sleeve member is manufactured by injection molding.

17. A method for packing a parachute into its deployment receptacle, comprising the steps of:
   a) providing a parachute canopy to be packed and a parachute deployment receptacle into which the parachute will be packed;
   b) providing a parachute packing system according to claim 1;
   c) inserting the packing sleeve into the deployment receptacle to hold the receptacle open;
   d) folding the parachute canopy with the suspension lines and bridle of said parachute passing through the line passage slot;
   e) pushing the folded parachute canopy through the packing sleeve and into the deployment receptacle; and
   f) removing the packing sleeve from the deployment receptacle.

18. The method of claim 17, further comprising the steps of attaching the packing sleeve to a packing mat by inserting an integral mat attachment hook into a receiving slot therefor, prior to folding the parachute canopy, and removing the packing sleeve from the packing mat after removing the packing sleeve from the deployment receptacle.

19. A parachute packing system, comprising:
a) an adjustable sleeve made from a flexible material that substantially conforms to a partial cylinder, the sleeve having rounded edges to prevent snagging of parachute material;
b) a line passage slot within the sleeve for passage of parachute suspension lines and bridle;
c) a pair of opposing deployment receptacle attachment points or knobs on an outer surface of the cylindrical sleeve member;
d) wherein at least one of the deployment receptacle attachment points or knobs engages a slotted track for sliding adjustment thereof, which can be adjusted and locked into position by means of a screw, bolt or nut;
e) an integral molded elongated mat attachment hook which runs across the bottom of the sleeve opening;
f) a packing mat made of non-slip or rubberized material;
g) a slot in the packing mat to accept the elongated hook on the system;
h) said mat having a smooth surface of plastic or a covering of textile to allow parachute material to slide freely; and
i) a parachute deployment receptacle for attachment to said sleeve member to accept the fabric parachute canopy material.

* * * * *